(12) United States Patent
Takashima et al.

(10) Patent No.: US 7,997,838 B2
(45) Date of Patent: Aug. 16, 2011

(54) MAIN SPINDLE DEVICE

(75) Inventors: Toshiharu Takashima, Kariya (JP); Yuji Okawa, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 343 days.

(21) Appl. No.: 12/424,925

(22) Filed: Apr. 16, 2009

(65) Prior Publication Data

US 2009/0263204 A1 Oct. 22, 2009

(30) Foreign Application Priority Data

Apr. 18, 2008 (JP) .................. 2008-108824

(51) Int. Cl.
*B23C 1/00* (2006.01)
*B23Q 5/04* (2006.01)
*B23Q 11/00* (2006.01)
*F16J 15/447* (2006.01)

(52) U.S. Cl. ........ 409/231; 409/134; 277/415; 277/418; 277/420; 277/432

(58) Field of Classification Search .......... 409/231–233, 409/904, 134, 135, 136, 137; 408/239 A, 408/239 R; 82/147; 277/415, 412, 418–420, 277/431, 432

See application file for complete search history.

(56) References Cited

U.S. PATENT DOCUMENTS

| 3,698,725 A | * | 10/1972 | Klabunde ...................... 409/231 |
| 4,382,638 A | | 5/1983 | Andoh et al. |
| 6,099,216 A | * | 8/2000 | Momochi et al. .............. 409/132 |
| 6,497,538 B1 | * | 12/2002 | Lind ............................. 409/231 |
| 2006/0239598 A1 | * | 10/2006 | Matsuyama et al. ........... 384/462 |
| 2009/0263202 A1 | * | 10/2009 | Takashima et al. ............ 409/231 |

FOREIGN PATENT DOCUMENTS

| DE | 4015241 A1 | * | 11/1991 |
| EP | 1 312 442 A2 | | 5/2003 |
| EP | 1 312 442 A3 | | 5/2003 |
| JP | 2000-18395 | | 1/2000 |
| JP | 2002-239867 A | * | 8/2002 |
| JP | 2006-043883 A | * | 2/2006 |

OTHER PUBLICATIONS

Machine Translation of JP-2002-239867, which JP '867 was published Aug. 2002.*
U.S. Appl. No. 12/424,932, filed Apr. 16, 2009, Takashima, et al.

* cited by examiner

*Primary Examiner* — Erica E Cadugan
(74) *Attorney, Agent, or Firm* — Oblon, Spivak, McClelland, Maier & Neustadt, L.L.P.

(57) ABSTRACT

A main spindle device includes: a housing having an air supply passage; a spindle that is inserted into the housing and supported by a bearing so as to be able to rotate relative to the housing; and an air sealing member that is positioned between an outer circumferential surface of the spindle and the housing on a front side with respect to the bearing along a rotation axis of the spindle, has a substantially annular shape, and is detachably fixed to the housing with an inner circumferential surface of the air sealing member facing the outer circumferential surface of the spindle, wherein air supplied from the air supply source through the air supply passage is discharged into a gap between the outer circumferential surface of the spindle and the housing, thereby effecting non-contact air sealing at least between the inner circumferential surface of the air sealing member and the outer circumferential surface of the spindle.

10 Claims, 5 Drawing Sheets

MAIN SPINDLE DEVICE

INCORPORATION BY REFERENCE

The disclosure of Japanese Patent Application No. 2008-108824 filed on Apr. 18, 2008 including the specification, drawings and abstract is incorporated herein by reference in its entirety.

BACKGROUND OF THE INVENTION

1. Field of the Invention

The invention relates to a main spindle device for a machine tool, and in particular, to an air sealing structure that forms a gap between a main spindle and a housing.

2. Description of the Related Art

A main spindle used in a main spindle device of a machine tool is inserted into a housing, and supported by a bearing so as to be able to rotate relative to the housing. A tool, a workpiece, or the like is held at the tip of the main spindle to perform machining, and in general, machining is performed while spraying coolant etc. (cutting fluid etc.) onto the tool, the workpiece, or the like, for the purpose of preventing seizure at the machined portion, improving the plane accuracy, etc. However, coolant, foreign matter (chips), etc. can easily pass through the gap between the housing and the main spindle and reach the bearing. When the coolant etc. reach the bearing, there is a possibility that seizure of the bearing occurs. For this reason, various types of sealing structures have been used to prevent the coolant, foreign matter, etc. from entering through the gap between the housing and the main spindle and reaching the bearing, and in general, air sealing is used.

For example, the related art described in Japanese Patent Application Publication No. 2000-18395 (JP-A-2000-18395) is a main spindle device 101 that uses an air sealing structure shown in FIGS. 4A, 4B and 5 and includes a non-contact, air sealing structure that effects sealing by discharging compressed air (hereinafter referred to as "air") through a gap between a housing, which includes a housing body 20 and a bearing holding lid member 130, and a main spindle 110. FIG. 4A shows a sectional view taken along the plane including the rotation axis ZT of the main spindle 110 (note that a tool T and a tool holder H are not shown in section). FIG. 4B shows a diagram when viewed from the direction indicated by the arrow BB with the tool T and the tool holder H omitted from FIG. 4A. FIG. 5 is an enlarged view of the AS1 portion in FIG. 4A. As shown in FIG. 4A, the tool T is fitted to the tool holder H, which is in turn fitted to a tip portion of the main spindle 110. The main spindle 110 is inserted into the housing, which includes the housing body 20 and the bearing holding lid member 130, and supported by a bearing J so as to be able to rotate about the rotation axis ZT relative to the housing body 20.

The bearing holding lid member 130 in which a hole is formed, into which the main spindle 110 can be inserted, is fitted into the housing body 20 along the direction of the rotation axis ZT, and the air sealing structure is formed between the inner circumferential surface of the bearing holding lid member 130 and the outer circumferential surface of the main spindle 110. As shown in FIG. 5, which is an enlarged view of the AS1 portion in FIG. 4A, a first annular groove M1, a second annular groove M2, and a third annular groove M3 are formed on an outer circumferential surface of the main spindle 110 in the circumferential direction. On part of an inner circumferential surface of the bearing holding lid member 130 that faces the first annular groove M1, an inner-side air receiving groove MA is formed in the circumferential direction. On part of the inner circumferential surface of the bearing holding lid member 130 that faces the second annular groove M2, an inner-side air receiving groove MB is formed in the circumferential direction. On part of the inner circumferential surface of the bearing holding lid member 130 that faces the third annular groove M3, an inner-side air receiving groove MC is formed in the circumferential direction. An air receiving area AK1 is created by the first annular groove M1 and the inner-side air receiving groove MA, a collection space AK2 is created by the second annular groove M2 and the inner-side air receiving groove MB, and an air receiving area AK3 is created by the third annular groove M3 and the inner-side air receiving groove MC. The air supplied from the air supply source (not shown) is distributed to air supply passages AL1 and AL2 and supplied to the first annular groove M1 (air receiving area AK1) and the third annular groove M3 (air receiving area AK3). The air supplied to the air receiving area AK1 is discharged through air sealing gaps AG1 and AG2 to effect air sealing, and the air supplied to the air receiving area AK3 is discharged through air sealing gaps AG3 and AG4 to effect air sealing. In case that coolant etc. pass through the air sealing gaps AG1 and AG2, a discharging passage DL for discharging the entered coolant etc. is formed in a lower portion of the inner circumferential surface of the housing that faces the collection space AK2, whereby the entrance of coolant etc. into the bearing J is prevented.

In the case of the related art described in JP-A-2000-18395, the discharge of air from the first annular groove M1, to which the air supply passage AL1 is connected, and the discharge of air from the third annular groove M3, to which the air supply passage AL2 is connected, do not occur uniformly all around the periphery of the main spindle 110, that is, air is discharged mostly at the portions at which the air supply passages AL1 and AL2 are connected, and the amount of air discharged decreases with the distance from such connection portions. This is because air is discharged through the air sealing gaps AG1, AG2, AG3, and AG4 before the air receiving areas AK1 and AK3 shown in FIG. 5 are sufficiently filled with air. Thus, coolant, foreign matter, etc. enter through the portions on the outer circumferential surface of the main spindle 110, at which the amount of air discharged is relatively small, which can cause seizure of the bearing J. The air sealing gaps AG1 to AG4 are set to approximately 50 μm, for example, to provide air sealing function, and are therefore very small gaps. Thus, when the tool T, the tool holder H, and/or the main spindle 110 interfere (collide) with another member due to an operational error by the operator, a defect in the machining program, etc., in some cases, the main spindle 110 contacts the housing (bearing holding lid member 130) and damage and/or seizure can occur. In general, a selection is made so that the material for the bearing holding lid member 130 has a mechanical strength lower than that of the main spindle 110, and when the damage of the bearing holding lid member 130 due to the collision is severe, the bearing holding lid member 130 has to be replaced. However, much time and costs are required to produce a bearing holding lid member 130 that is a relatively large part, and to replace the damaged bearing holding lid member 130.

SUMMARY OF THE INVENTION

The invention provides a main spindle device that realizes air sealing such that discharge of air uniformly occurs all around the periphery of a main spindle, and with which it is possible to replace a part in a relatively short period of time at a relatively low cost even when the need for replacement of the part arises due to collision etc.

A main spindle device according to an aspect of the invention includes: a housing having an air supply passage therein to which an air supply source is connected; a main spindle that is inserted into the housing and supported by a bearing so as to be able to rotate relative to the housing; and an air sealing member that is positioned between an outer circumferential surface of the main spindle and the housing on a front side with respect to the bearing along the rotation axis of the main spindle, has a substantially annular shape, and is detachably fixed to the housing with an inner circumferential surface of the air sealing member facing the outer circumferential surface of the main spindle, wherein air supplied from the air supply source through the air supply passage is discharged into a gap between the outer circumferential surface of the main spindle and the housing, thereby effecting non-contact air sealing at least between the inner circumferential surface of the air sealing member and the outer circumferential surface of the main spindle.

According to the main spindle device with this configuration, the substantially annular, relatively small air sealing member is used that is separate from the housing and that can be attached to and detached from the housing, whereby it is made possible to replace a part in a short period of time when the need for replacing the part arises due to the damage caused by collision or the like (the smallest gap between the housing and the main spindle is the gap for air sealing, and therefore, the possibility is high that the air sealing gap portion is damaged prior to the occurrence of damage to other portions at the time of collision). The air sealing member detachably fixed to the housing is smaller than the housing and is therefore easily replaced at a relatively lower cost.

The spindle device of the above aspect may be configured such that a first outer-side air receiving groove is formed, in the circumferential direction, on an outer circumferential surface of the air sealing member at a position at which air is supplied through the air supply passage in the housing, and a plurality of communication holes or a plurality of slits are formed in the air sealing member all around the periphery thereof, the plurality of communication holes or the plurality of slits passing through the air sealing member from the first outer-side air receiving groove to the inner circumferential surface of the air sealing member.

According to the spindle device with this configuration, the air supplied to the air supply passage is not directly introduced into the gap between the outer circumferential surface of the main spindle and the inner circumferential surface of the housing but first introduced into the first outer-side air receiving groove formed on the outer circumferential surface of the air sealing member. The escape for the air in the first outer-side air receiving groove is the communication holes or the slits, and when the number and the size of the communication holes (or slits) are set so as to give appropriate resistance, it is possible to fill the air receiving area, created by the first outer-side air receiving groove, with air substantially uniformly all around the periphery of the air receiving area and it is therefore possible to introduce air from this air receiving area to the gap between the outer circumferential surface of the main spindle and the inner circumferential surface of the housing through the communication holes or the slits. In this way, it is possible to cause discharge of air to occur all around the periphery of the main spindle and it is possible to achieve uniform air sealing all around the periphery.

In the main spindle device according to the above aspect, a first annular groove may be formed, in a circumferential direction of the main spindle, on part of the outer circumferential surface of the main spindle that faces the inner circumferential surface of the air sealing member so that the first annular groove is covered by the inner circumferential surface of the air sealing member. The air supply passage may be connected to the first annular groove via a communication hole or a slit that is formed in the air sealing member.

According to the main spindle device with this configuration, the air receiving area for distributing the air supplied through the air supply passage all around the periphery of the main spindle is created by the first annular groove. In addition, the first annular groove is covered by the inner circumferential surface of the air sealing member, and therefore, by connecting the first annular groove and the air supply passage via the communication hole or the slit formed in the air sealing member, it is possible to properly supply air into the first annular groove.

The main spindle device of the above aspect may be configured such that a second annular groove and a third annular groove that are formed, in the circumferential direction of the main spindle, on part of the outer circumferential surface of the main spindle between the first annular groove and the bearing are arranged in an axial direction of the main spindle in parallel with each other in this order from the front side to a rear side opposite to the front side, the air supply passage is connected to the third annular groove, and a discharging passage that discharges fluid and foreign matter that enter through the gap between the housing and the main spindle is formed in a lower portion of the housing that faces the second annular groove. The air sealing member may be disposed at a position such that the air sealing member does not cover the second annular groove and the third annular groove but covers the first annular groove.

According to the main spindle device with this configuration, only the front-side air sealing gap (gaps AG1 and AG2 in the case of FIG. 5) is provided by the air sealing member on the front side on which the possibility of collision in the air sealing portion is high (when the gap of the air sealing portion is the same on the front side and the rear side), whereby it is possible to set the dimension of the air sealing member along the rotation axis of the main spindle to a relatively small length and it is therefore possible to make the air seal member relatively small. In general, a tool or the like is fitted to the main spindle on the front side and a shaft of a motor or the like is fixed to the main spindle on the real side. When a collision occurs, the main spindle swings on the point at which the shaft of a motor or the like is fixed to the main spindle. Thus, the amplitude of the swing of the main spindle is greater on the front side as compared to the rear side, and therefore, the possibility of collision in the air sealing portion is higher on the front side (when the gap in the air sealing portion is the same on the front side and the rear side).

The main spindle device of the above aspect may be configured such that the air supply passage includes a first air supply passage and a second air supply passage that are not connected to each other in the housing, the first air supply passage is connected to the first annular groove so as to supply air to the first annular groove, and the second air supply passage is connected to the third annular groove so as to supply air to the third annular groove.

According to the main spindle device with this configuration, the air supplied through the air supply passage is not distributed to the first annular groove and the third annular groove. Instead, the air is supplied to the first annular groove and the third annular groove separately through respective dedicated air supply passages. In this way, the amount of air discharged is greater than that in the case where the air is distributed, so that it is possible to achieve greater air sealing effect.

The main spindle device of the above aspect may be configured such that a first inner-side air receiving groove is formed, in a circumferential direction of the air sealing member, on part of the inner circumferential surface of the air sealing member that faces the first annular groove, a first outer-side air receiving groove is formed, in the circumferential direction of the air sealing member, on part of the outer circumferential surface of the air sealing member corresponding in axial position to the first inner-side air receiving groove, the first outer-side air receiving groove is connected to the air supply passage, and a plurality of communication holes or a plurality of slits that cause the first outer-side air receiving groove and the first inner-side air receiving groove to communicate with each other.

According to the main spindle device with this configuration, the air supplied to the air supply passage is not directly introduced into the first annular groove but first introduced into the first outer-side air receiving groove formed on the outer circumferential surface of the air sealing member. The escape for the air in the first outer-side air receiving groove is the communication holes or the slits, and when the number and the size of the communication holes (or slits) are set so as to give appropriate resistance, it is possible to fill the air receiving area, created by the first outer-side air receiving groove, with air substantially uniformly all around the periphery and it is therefore possible to introduce air from this air receiving area into the first annular groove through the communication holes or the slits. In this way, the air introduced into the air receiving area created by the first annular groove and the first inner-side air receiving groove is made uniform all around the periphery, so that it is possible to cause discharge of air to occur all around the periphery of the main spindle and it is possible to achieve uniform air sealing all around the periphery.

The main spindle device of the above aspect may be configured such that the air supplied to the first annular groove is discharged into a first air sealing gap that is defined by a first outer circumferential surface portion that is part of the outer circumferential surface of the main spindle on the front side of the first annular groove and by part of the inner circumferential surface of the air sealing member that faces the first outer circumferential surface portion, and also discharged into a second air sealing gap that is defined by a second outer circumferential surface portion that is part of the outer circumferential surface of the main spindle on the rear side of the first annular groove and by part of the inner circumferential surface of the air sealing member that faces the second outer circumferential surface portion, and the first and second air sealing gaps are formed so that a resistance to discharge of air through the first air sealing gap is less than a resistance to discharge of air through the second air sealing gap.

According to the main spindle device with this configuration, the amount of air discharged on the front side on which fluid and foreign matter enter is greater than the amount of air discharged on the rear side. Thus, it is possible to achieve greater air sealing effect on the front side, so that it is possible to more properly suppress the entrance of fluid and foreign matter on the front side.

The main spindle device of the above aspect may be configured such that the first air sealing gap and the second air sealing gap are formed so that the distance between the first outer circumferential surface portion and the corresponding part of the inner circumferential surface of the first air sealing gap and the distance between the second outer circumferential surface portion and the corresponding part of the inner circumferential surface of the second air sealing gap are substantially equal to each other, and the length of the second air sealing gap in the direction of the rotation axis is smaller than the length of the first air sealing gap in the direction of the rotation axis.

According to the main spindle device with this configuration, the lengths LG1 and LG2 of the air sealing gaps AG1 and AG2 in the direction of the rotation axis ZT, in the case of FIG. 2, are set such that the length LG1 on the front side is smaller than the length LG2. In this way, it is possible to more properly suppress the entrance of fluid and foreign matter on the front side.

In the main spindle device of the above aspect, the air sealing member may be detachably fixed to the housing by transition fit.

According to the main spindle device with this configuration, the air sealing member is fitted to the housing by transition fit, so that attachment and detachment at the time of replacement needed are easy and the replacement can be done in a short period of time.

The main spindle device of the above aspect may be configured such that the main spindle and the air sealing member are made of respective materials that are different from each other, and the air sealing member is made of the material that has a mechanical strength lower than a mechanical strength of the material for the main spindle.

According to the main spindle device with this configuration, the air sealing member is made of a material with higher brittleness (material with lower mechanical strength) as compared to the material for the main spindle. In this case, when the main spindle and the air sealing member contact each other, damage to the air sealing member is greater. Thus, it is possible to minimize the damage of the main spindle to avoid the need for replacement of the main spindle and replacement of the air sealing member will suffice, so that it is possible to replace the damaged part (air sealing member) in a shorter period of time at a lower cost.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1A:
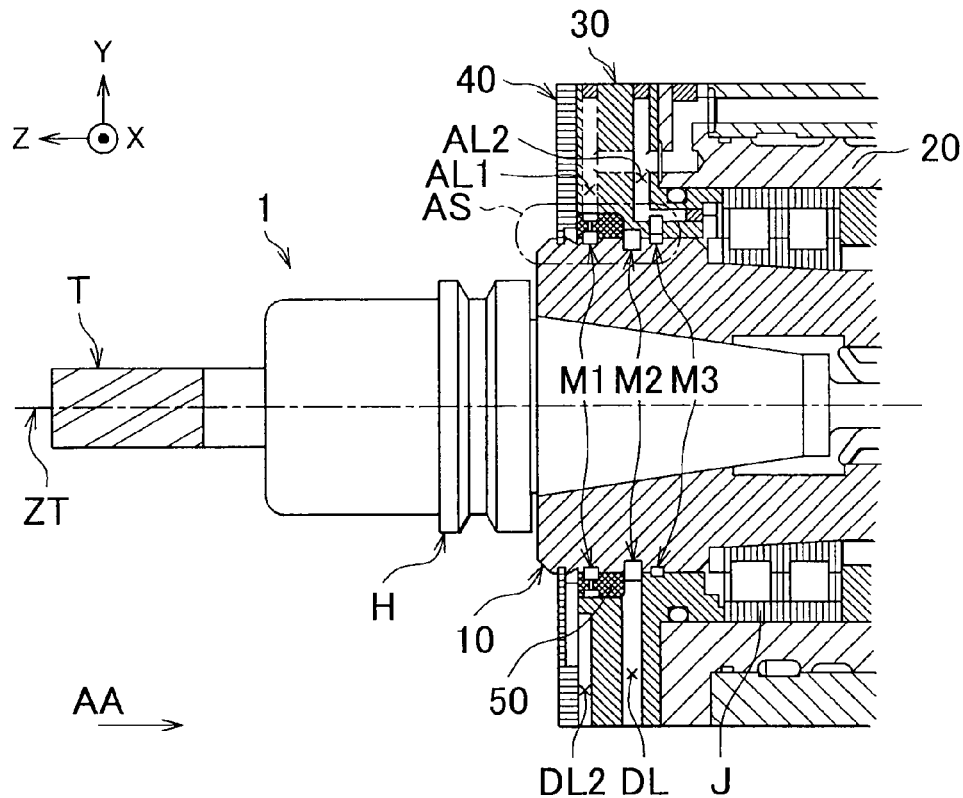
FIG. 1A is a sectional view for explaining a structure of an embodiment of a spindle device 1 of the invention.
Figure 1B:
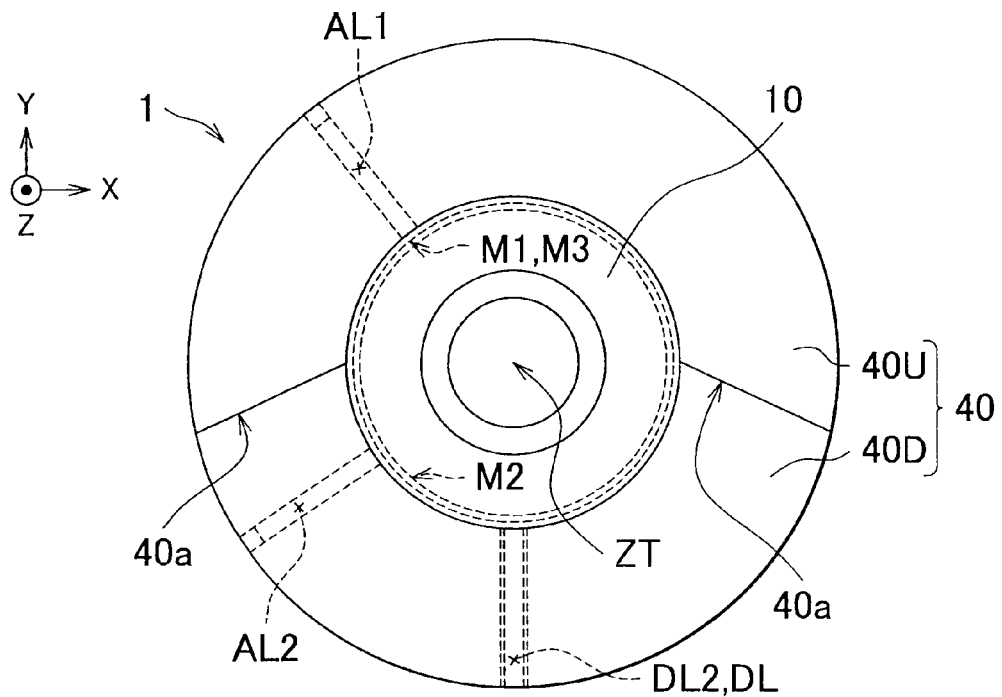
FIG. 1B is a front view for explaining the structure of the embodiment of the spindle device 1 of the invention.

An example embodiment for carrying out the invention will be described below with reference to drawings. FIG. 1A shows an example of a sectional side view of a main spindle device 1 of the invention. FIG. 1B shows an example of a diagram (front view) when viewed from the direction indicated by the arrow AA in FIG. 1A. FIG. 1A shows a sectional view taken along the plane including the rotation axis ZT of a main spindle 10 (note that a tool T and a tool holder H are not shown in section). In FIG. 1B, the tool T and the tool holder H are omitted. In all the figures, the X, Y, and Z axes are orthogonal to each other. The axis Y represents the vertical direction, and the X and Z axes represent horizontal directions, where the Z axis represents the direction along the rotation axis ZT of the main spindle 10.

(Overall Structure of Spindle Device)

As shown in FIG. 1A, the main spindle device 1 of this embodiment includes: a housing (in this embodiment, the housing includes a housing body 20 and a bearing holding lid member 30) provided with air supply passages AL1 and AL2; and the main spindle 10 that is inserted into the housing and supported by a bearing J so as to be able to rotate about the rotation axis ZT relative to the housing. The air supply passages AL1 and AL2 are connected to an air supply source (not shown) and supplied with air. The tool T (end mill in the example shown in FIG. 1) is fitted to the tool holder H. The tool holder H is fitted to a front-side tip portion of the main spindle 10 (so that the tool holder H can be replaced). Note that the "front" herein means the direction from the bearing side to the tool side along the rotation axis ZT, that is, the direction of Z axis, or the left, in FIG. 1, for example. Moreover, the "air sealing" herein means non-contact sealing achieved via air.

The substantially annular bearing J is fitted into the inner wall of the housing body 20 in the direction of the rotation axis ZT (from the left in FIG. 1A). In addition, the bearing holding lid member 30 that holds the bearing J in the direction of the rotation axis ZT is fitted into the housing body 20 in the direction of the rotation axis ZT (from the left in FIG. 1A). A hole, through which the main spindle 10 can be inserted, is formed in the bearing holding lid member 30. A substantially annular air sealing member 50 is detachably fixed to the bearing holding lid member 30 along the direction of the rotation axis ZT (from the left in FIG. 1A). For example, the air sealing member 50 is fixed to the bearing holding lid member 30 by transition fit, which is advantageous in ease of removal and in the small amount of air leak, or by bolts, which significantly facilitate detachment of the air sealing member 50. Note that the air sealing member 50 is fixed after performing an adjustment so that the gap between the inner circumferential surface of the air sealing member 50 and the outer circumferential surface of the main spindle 10 becomes substantially even all around the perimeter. Then, the main spindle 10 is inserted into the housing (including the housing body 20 and the bearing holding lid member 30) and the bearing J in the direction of the rotation axis ZT (from the left in FIG. 1A). In addition, a housing lid member 40 provided with a hole, through which the main spindle 10 is inserted, is attached so that the housing lid member 40 covers the front-side face of the bearing holding lid member 30 and the air sealing member 50. The housing lid member 40 is divided into an upper housing lid member 40U and a lower housing lid member 40D at a division line 40a in the example shown in FIG. 1B. In the bearing holding lid member 30 (that is, the housing), a discharging passage DL for discharging coolant and/or foreign matter that enters through the gap between the housing and the main spindle 10 is formed. In addition, a discharging passage DL2 is formed at the interface portion between the housing lid member 40 and the bearing holding lid member 30 on the front side with respect to the discharging passage DL.

(Detail of Air Sealing Structure Portion)

Figure 2:
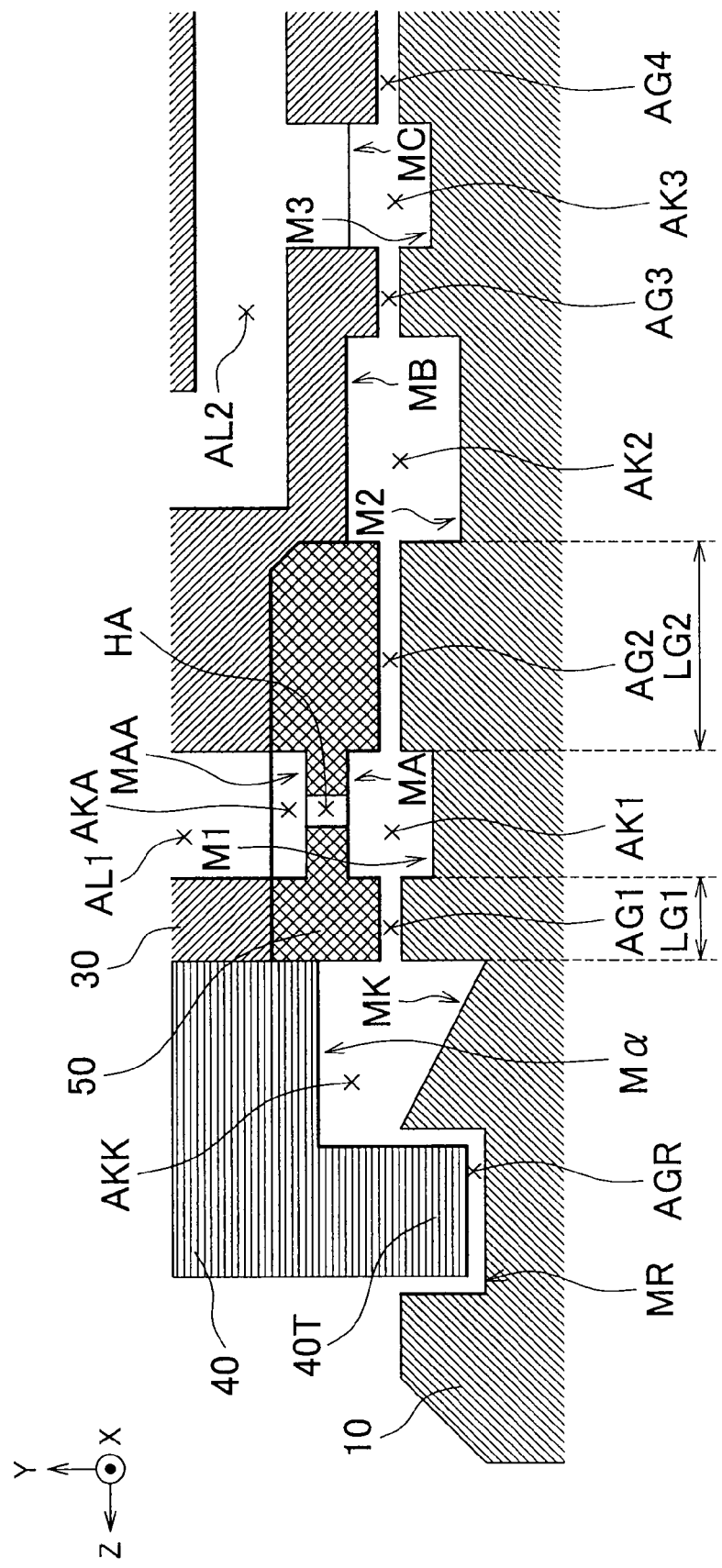
FIG. 2 is an enlarged view of the AS portion in FIG. 1A.

In the spindle device 1, air (compressed air) is supplied from the air supply source through the air supply passages AL1 and AL2 and the supplied air is discharged through the gap between the outer circumferential surface of the spindle 10 and the inner circumferential surface of the housing, whereby non-contact air sealing is effected. A structure that effects the air sealing will be described with reference to FIG. 2. FIG. 2 is an enlarged view of the AS portion in FIG. 1A. On the outer circumferential surface of the part of the main spindle 10 that is inserted in the housing, on the front side with respect to the bearing J, a first annular groove M1, a second annular groove M2, and a third annular groove M3 are formed in the circumferential direction of the main spindle 10, arranged in parallel in this order from the front side to the rear side (the side opposite to the front side) (in the example shown in FIG. 2, from left to right). In a lower portion of the housing that faces the second annular groove M2, the discharging passage DL for discharging fluid (coolant, etc.) that enters through the gap between the housing and the main spindle 10 is formed (see FIGS. 1A and 1B).

The air sealing member 50 shown in FIG. 2 is disposed at the position such that the air sealing member 50 does not cover the second annular groove M2 and the third annular groove M3 but covers the first annular groove M1, and therefore, the air sealing member 50 is formed relatively small. A first inner-side air receiving groove MA is formed, in the circumferential direction, on part of the inner circumferential surface of the air sealing member 50 that faces the first annular groove M1, and a first outer-side air receiving groove MAA is formed, in the circumferential direction, on part of the outer circumferential surface of the air sealing member 50 that faces the first inner-side air receiving groove MA. The first outer-side air receiving groove MAA and the first inner-side air receiving groove MA are communicated with each other via a plurality of communication holes HA (or a plurality of slits, etc.). It is preferable that the plurality of holes HA (or the slits etc.) be formed at regular intervals all around the perimeter.

The air supply passage AL1 is connected to the outer-side air receiving groove MAA, and the air supplied is filled into an air receiving area AKA that is created by the first outer-side air receiving groove MAA. The escape for the air filled into the air receiving area AKA is the communication holes HA only, and it is possible to make substantially uniform the pressure of the air filled into the air receiving area AKA all around the perimeter by appropriately setting the number and the size of the communication holes HA. In addition, the air filled so that the pressure thereof is made substantially uniform all around the perimeter in the air receiving area AKA passes through the communication holes HA and is introduced into an air receiving area AK1 created by the first inner-side air receiving groove MA and the first annular groove M1 so that the air diffuses substantially uniformly all around the perimeter. In addition, the air introduced into the air receiving area AK1 is discharged through a first air sealing gap AG1 that is defined by an outer circumferential surface of the main spindle 10 on the front side with respect to the first annular groove M1 and an inner circumferential surface of the air sealing member 50 on the front side with respect to the first inner-side air receiving groove MA so that the amount of air discharged is substantially uniform all around the perimeter. Thus, it is possible to achieve the air sealing effect that is substantially uniform all around the perimeter. Similarly, air is discharged through a second air sealing gap AG2 that is defined by an outer circumferential surface of the main spindle 10 on the rear side with respect to the first annular groove M1 and an inner circumferential surface of the air sealing member 50 on the rear side with respect to the first inner-side air receiving groove MA so that the amount of air discharged is substantially uniform all around the perimeter. Thus, it is possible to achieve the air sealing effect that is substantially uniform all around the perimeter.

In the case of the first air sealing gap AG1, air is discharged in the direction from the rear side to the front side, and on the other hand, in the case of the second air sealing gap AG2, air is discharged in the direction from the front side to the rear side. Because coolant, foreign matter, etc. enter through the gap between the housing and the main spindle 10 from the front side thereof, it is preferable that the amount of air discharged through the first air sealing gap AG1 be greater than the amount of air discharged through the second air sealing gap AG2. Thus, the first air sealing gap AG1 and the second air sealing gap AG2 are formed so that the resistance to the discharge of air through the second air sealing gap AG2 is less than the resistance to the discharge of air through the first air sealing gap AG1. For example, the distance between the outer circumferential surface of the main spindle 10 and the inner circumferential surface of the air sealing member 50 of the first air sealing gap AG1 is set substantially equal to the distance between the outer circumferential surface of the main spindle 10 and the inner circumferential surface of the air sealing member 50 of the second air sealing gap AG2. In addition, the first air sealing gap AG1 and the second air sealing gap AG2 are formed so that the length LG1 of the first air sealing gap AG1 in the direction of the rotation axis ZT is smaller than the length LG2 of the second air sealing gap AG2 in the direction of the rotation axis ZT. In this way, it is possible to make the amount of air discharged through the first air sealing gap AG1 greater than the amount of air discharged through the second air sealing gap AG2, thereby improving sealing performance.

In addition, a construction is adopted in which the air supply passages AL1 and AL2 are not connected to each other in the housing, and air is separately supplied to the air supply passage AL1 and the air supply passage Al.2 from the air supply source. The air supply passage AL1 is connected to the first annular groove M1 so as to supply air thereto, and the air supply passage AL2 is connected to the third annular groove M3 so as to supply air thereto. In this way, it is possible to allow a stable amount of air to be discharged from the air receiving area AK1 created by the first annular groove M1 and the first inner-side air receiving groove MA and from an air receiving area AK3 created by the third annular groove M3 and an inner-side air receiving groove MC, which functions as the second inner-side air receiving groove. If the air supply passages AL1 and AL2 are connected to each other, when the resistance to the discharge of air through one of the air receiving areas is relatively lower, the amount of air discharged from the one air receiving area increases and the amount of air discharged from the other air receiving area decreases, which is not preferable. A collection space AK2 defined by the second annular groove M2 and an inner-side air receiving groove MB collects the air from the second air sealing gap AG2 and the air from a third air sealing gap AG3 and also collects coolant, foreign matter, etc. that have entered, and the air, coolant, foreign matter, etc. that are collected are discharged through the discharging passage DL.

In the above description, a case has been described where the relatively small air sealing member 50 is disposed at the position such that the air sealing member 50 covers the first annular groove M1 only. However, although the size of the air sealing member 50 is increased a little, a configuration may be adopted in which the dimension of the air sealing member 50 (the length thereof in the direction of the rotation axis ZT) is increased so that the air sealing member 50 covers the first to third annular grooves M1 to M3. In this case, the inner-side air receiving groove MB and the inner-side air receiving groove MC, which functions as the second inner-side air receiving groove, are formed in the air sealing member 50. As in the case of the portion opposite to the first annular groove M1 in the air sealing member 50, an outer-side air receiving groove, which functions as the second outer-side air receiving groove, is formed on the outer circumferential surface opposite to the inner-side air receiving area MC, and the outer-side air receiving groove and the inner-side air receiving groove MC are communicated with each other via a plurality of communication holes or a plurality of slits. Then, the air supply passage AL2 is connected to the outer-side air receiving groove.

The air sealing member 50 is made of cast iron or gunmetal and the main spindle 10 is made of iron. In this way, the material for the air sealing member 50 and the material for the main spindle 10 are different from each other. This reduces the possibility that galling (seizure etc.) occurs when the air sealing member 50 and the main spindle 10 contact each other. It is preferable that the material for the air sealing member 50 have a relatively lower mechanical strength (higher brittleness), because when the main spindle 10 and the air sealing member 50 contact each other due to, for example, the collision between the tool and a workpiece, costs and time needed for replacement are very small in the case where the air sealing member 50, which is a relatively small part, is replaced as compared to the case where the main spindle 10 is replaced.

(Detail of Labyrinth Structure Portion)

Next, a labyrinth structure, providing a labyrinth-like complex space, that is formed in part of the gap between the main spindle 10 and the housing in order to reduce the entrance of coolant, foreign matter, etc. will be described with reference to FIG. 2. On the outer circumferential surface of a protruding portion of the main spindle 10 that protrudes from the housing on the front side, a labyrinth-forming annular groove MR is formed in the circumferential direction of the main spindle 10. In addition, a convex portion 40T of the housing lid member 40 on the inner side thereof is inserted into the labyrinth-forming annular groove MR all around the perimeter along the radial direction of the main spindle 10 so as not to contact the labyrinth-forming annular groove MR, whereby a labyrinth gap AGR that is created between the labyrinth-forming annular groove MR and the convex portion 40T has a labyrinth-like complex form.

As shown in FIG. 2, due to the positional relation between the convex portion 40T of the housing lid member 40 and the labyrinth-forming annular groove MR of the main spindle 10, even a discoid housing lid member 40 provided with a hole, through which the main spindle 10 is inserted, at the center portion thereof cannot be attached to the bearing holding lid member 30 along the rotation axis ZT from the front side to the rear side. Accordingly, the housing lid member 40 is divided into two or more pieces. In this embodiment, the housing lid member 40 is divided into the upper housing lid member 40U and the lower housing lid member 40D at the division line 40a. The upper housing lid member 40U and the lower housing lid member 40D are installed such that the convex portion 40T is inserted into the labyrinth-forming annular groove MR along the direction orthogonal to the rotation axis ZT, and are fixed to the bearing holding lid member 30 by bolts etc.

The rotation axis ZT of the main spindle 10 is the horizontal direction, or a direction inclined by a predetermined angle, which is not equal to zero, with respect to the vertical direction, and the division line 40a of the housing lid member 40 that is constructed so that it is divided into two or more pieces is located in the lower half portion when the housing lid member 40 is divided into upper and lower halves. The division line 40a is set so as to be inclined downward from the radially inner side to the radially outer side of the housing lid member 40. Thus, even when coolant or the like enters at the division line 40a, the coolant entered flows downward and does not reach the gap between the main spindle 10 and the housing.

Figure 3A:
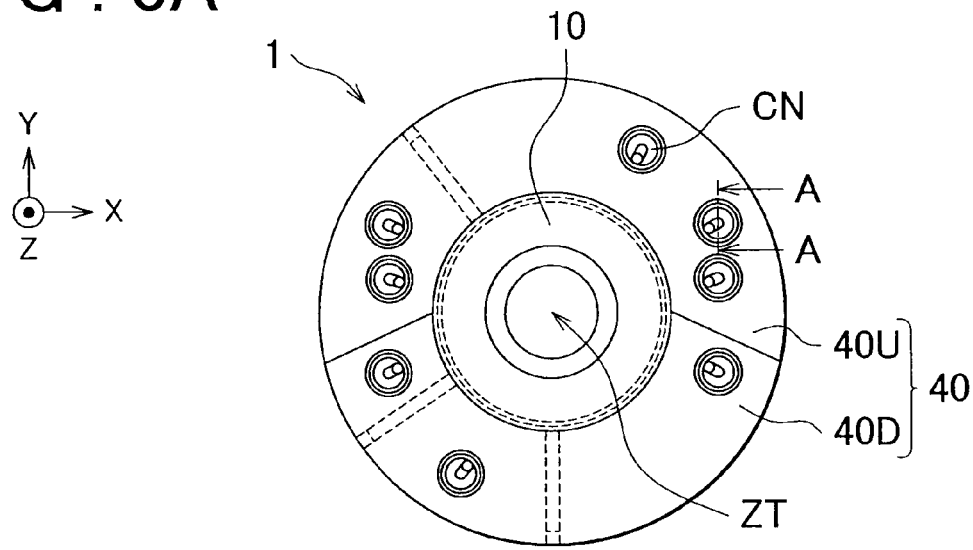
FIG. 3A is a front view for explaining a state where a plurality of coolant nozzles CN are provided in FIG. 1B.
Figure 3B:
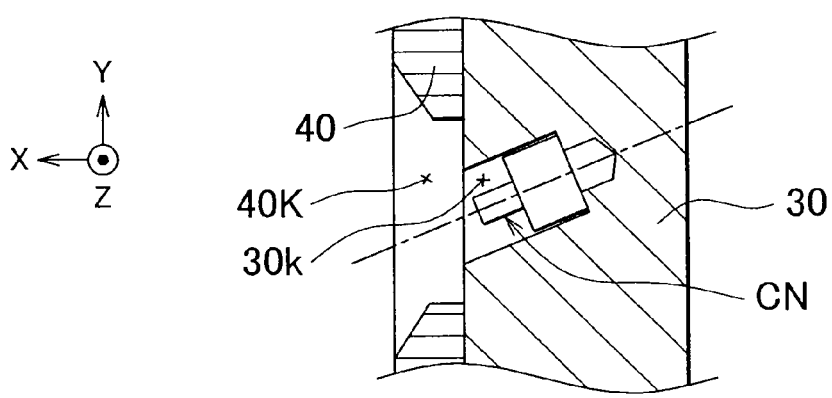
FIG. 3B is an A-A sectional view of FIG. 3A.
Figure 3C:
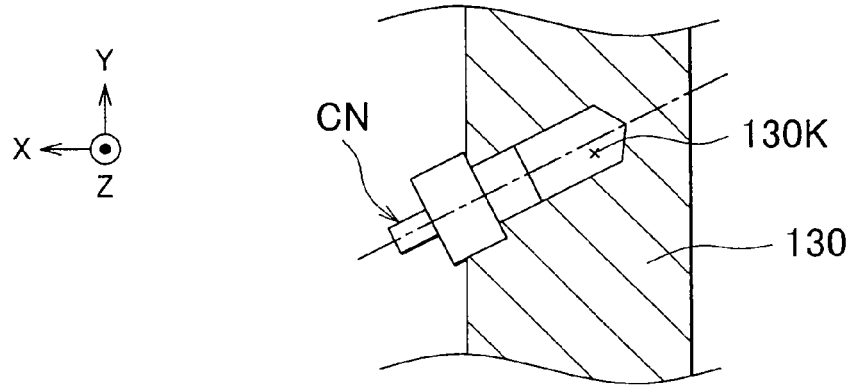
FIG. 3C is a sectional view of related art corresponding to the A-A sectional view of FIG. 3A.
Figure 4A:
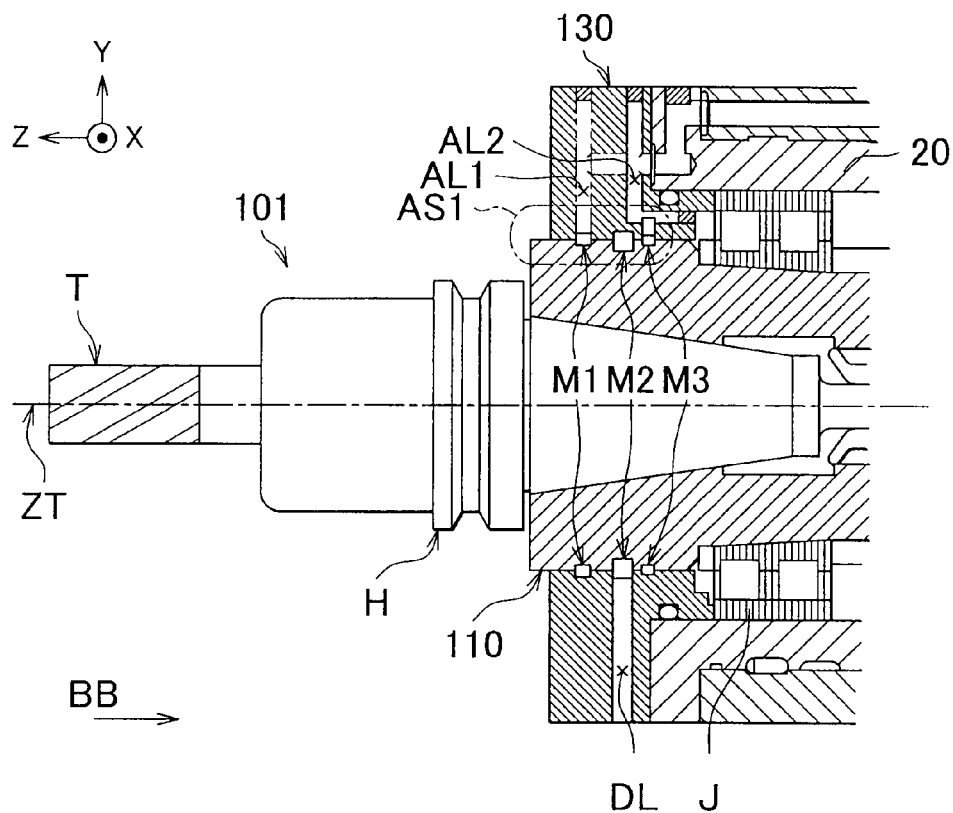
FIG. 4A is a sectional view for explaining a structure of a spindle device 101 of related art.
Figure 4B:
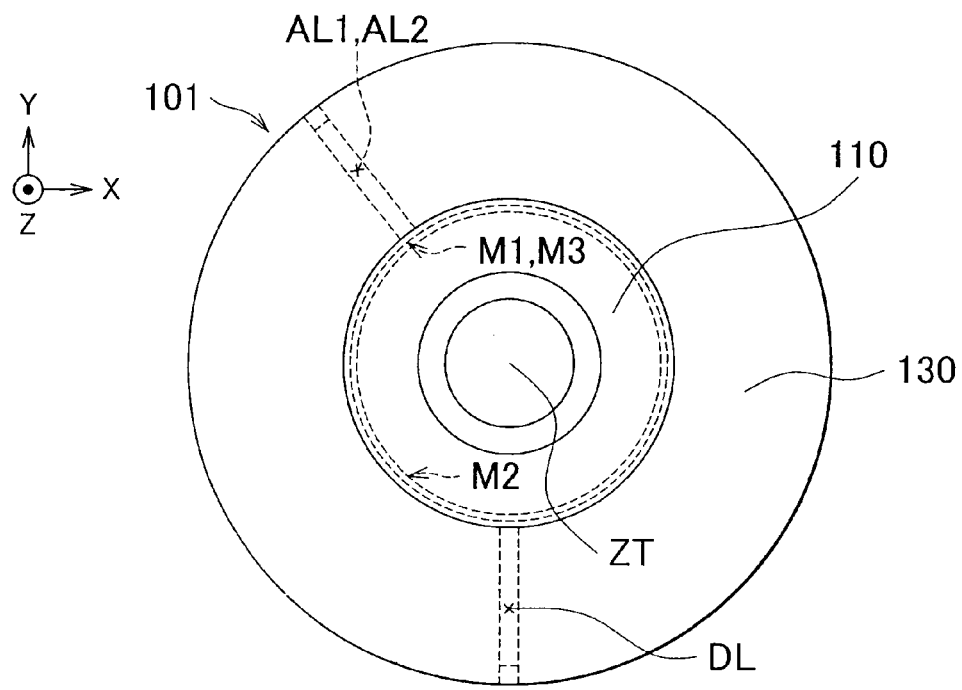
FIG. 4B is a front view for explaining the structure of the spindle device 101 of related art.
Figure 5:
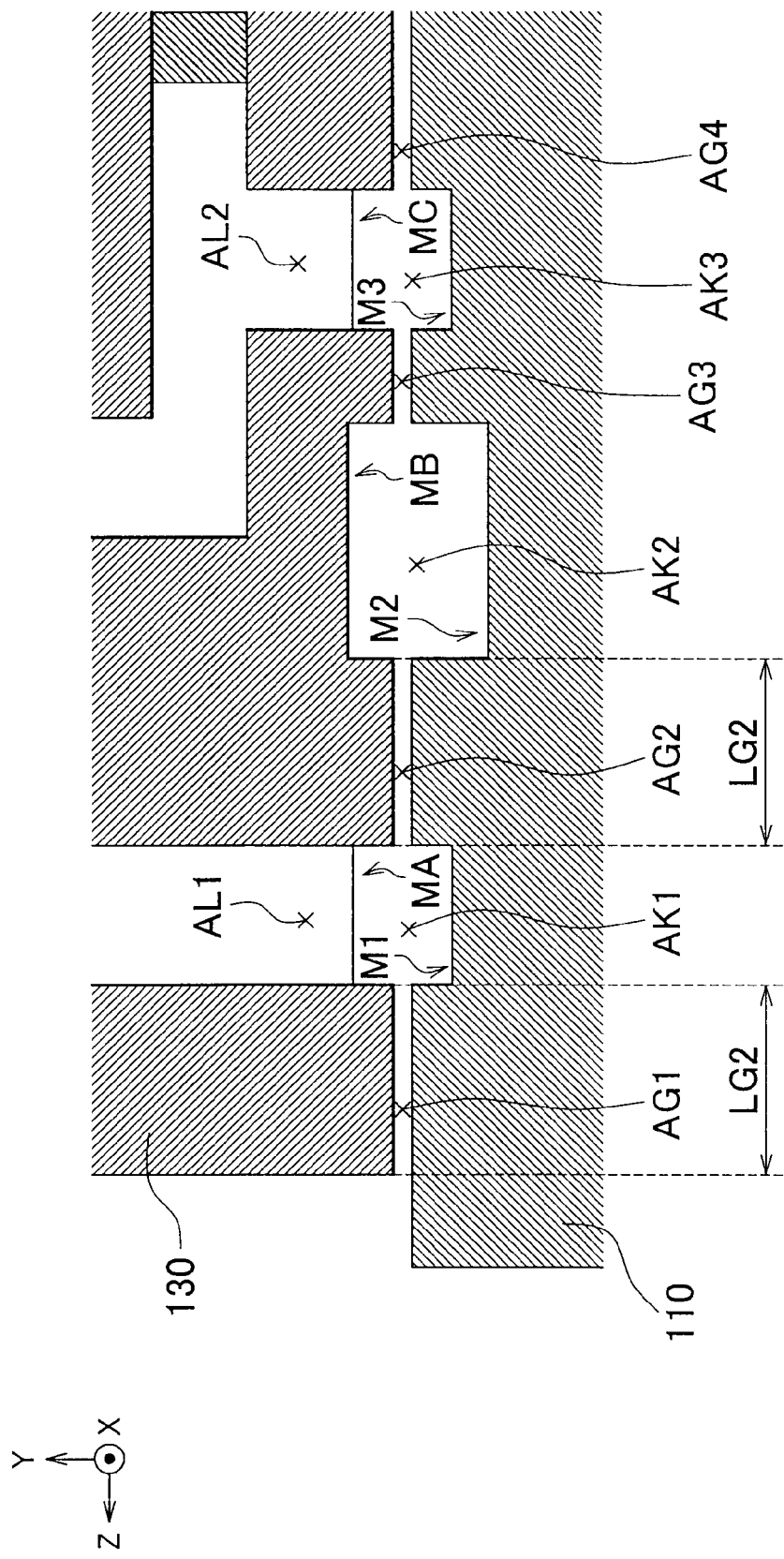
FIG. 5 is an enlarged view of the AS1 portion of the spindle device 101 of related art.

Next, the spray means for spraying coolant will be described with reference to FIGS. 3A to 3C. FIG. 3A shows a main spindle device corresponding to the main spindle device shown in FIG. 1 that includes a plurality of coolant nozzles CN for spraying (discharging) coolant on the front face of the housing. Note that the number of coolant nozzles CN may be one. FIG. 3B shows the A-A cross section of FIG. 3A, showing an example of how the coolant nozzles CN are housed in the case of this embodiment. FIG. 3C shows a conventional manner in which the coolant nozzles CN are housed, for comparison with those shown in FIG. 3B. A plurality of housing holes 30K that house the coolant nozzles so as not for the coolant nozzles to protrude from the housing are formed from the front side toward the rear side in the front end portion of the housing (in this case, the front end portion of the bearing holding lid member 30) that abuts the housing lid member 40. In addition, openings 40K are formed in the housing lid member 40 at the positions corresponding to the housing holes 30K. The axial direction of each of the coolant nozzles CN and the axial direction of each of the housing holes 30K are obliquely directed toward the direction in which coolant is sprayed. As described above, the housing lid member 40 divided into two or more pieces is installed from the direction orthogonal to the rotation axis ZT, and therefore, in order to avoid the interference of the coolant nozzles CN, a design is made so that there is no concave portion (protrusion) on the front end portion of the housing that abuts the housing lid member 40.

With regard to the front view of the main spindle device 1 shown in FIG. 1B (the tool T and the tool holder H are omitted in FIG. 1B), the coolant sprayed onto a tip portion of the tool T, a machined portion of a workpiece W, etc. flies toward various positions at various speeds in various directions. When coolant or the like enters through the gap between the main spindle 10 and the housing (the housing lid member 40 in this case), the entering coolant cannot enter into the further inner area unless it first passes through the labyrinth seal portion having the complex structure provided by the labyrinth-forming annular groove MR and the convex portion 40T. Because the labyrinth seal portion has the complex structure, even the coolant that flies at high speeds in the direction of the rotation axis ZT is reduced in momentum and loses its speed at which the coolant enters, and in addition, is reduced in amount because of dispersion, whereby it is made difficult for such coolant to enter into the further inner area.

On the rear side of the labyrinth seal portion, in a lower portion of the housing, the discharging passage DL2 for discharging fluid, such as coolant, and foreign matter that enter through the gap between the housing and the main spindle 10 is formed (see FIGS. 1A and 1B). In the rear side of the labyrinth seal portion, a collection space AKK that is a space greater in size than the space in the labyrinth gap AGR is created in the circumferential direction of the main spindle 10 all around the periphery. The collection space AKK is defined by an annular groove Mα formed on the inner circumferential surface of the housing lid member 40 in the circumferential direction and an annular groove MK formed on the outer circumferential surface of the main spindle 10 in the circumferential direction (the annular groove Mα is partially formed by the air sealing member 50 in the example shown in FIG. 2). The outer circumferential surface (the bottom of the annular groove MK) of the main spindle 10 facing the collection space AKK is formed as an oblique surface such that the diameter of the main spindle 10 increases from the rear side to the front side. By virtue of the oblique surface, even when coolant or the like enters into the collection space AKK, the coolant entered moves in the upward direction along the oblique surface due to the centrifugal force produced by the rotation of the main spindle 10 (that is, the direction from the rear side to the front side). Thus, the oblique surface provides a structure that makes it difficult for the coolant to enter into the further inner area. The discharging passage DL2 is formed in a lower portion facing the annular groove MK at the interface portion between the housing lid member 40 and the bearing holding lid member 30 (see FIGS. 1A and 1B), and is communicated with the collection space AKK. In the further inner area relative to the collection space AKK, the air sealing gaps AG1 to AG4 described above are disposed, and there is little coolant or the like that passes through all the gaps and reaches the bearing J. Thus, it is possible to properly prevent seizure of the bearing J and to improve the reliability of the main spindle device 1.

The invention is not limited to those having the external appearance, structure, etc. described using the embodiment and various modifications, and addition and removal of element(s) can be made within the scope of the spirit of the invention. In addition, the values used in the description of the embodiment are given by way of example and such values of the invention are not limited to these values.

What is claimed is:

1. A main tool spindle device comprising:
a housing having an air supply passage therein to which an air supply source is connected;
a main tool spindle that is inserted into the housing and supported by a bearing so as to be able to rotate relative to the housing; and
an air sealing member that is positioned between an outer circumferential surface of the main spindle and an inner surface of the housing on a front tool side with respect to the bearing along a rotation axis of the main spindle, has a substantially annular shape, and is detachably fixed to the housing with an inner circumferential surface of the air sealing member facing the outer circumferential surface of the main spindle,
wherein air supplied from the air supply source through the air supply passage is discharged into a gap between the outer circumferential surface of the main spindle and the housing, thereby effecting non-contact air sealing at least between the inner circumferential surface of the air sealing member and the outer circumferential surface of the main spindle,
wherein a first outer-side circumferential air receiving groove is formed on an outer circumferential surface of the air sealing member at a position at which air is supplied through the air supply passage in the housing, and
wherein a plurality of communication holes or slits are formed in the air sealing member all around the periphery thereof, the plurality of communication holes or the plurality of slits passing through the air sealing member from the first outer-side air receiving groove to the inner circumferential surface of the air sealing member.

2. The main spindle device according to claim 1, wherein the plurality of communication holes or slits connect the first outer-side air receiving groove to a first inner side air receiving groove formed in an inner circumferential surface of the air sealing member.

3. The main spindle device according to claim 1, wherein a first annular groove is formed, in a circumferential direction of the main spindle, on part of the outer circumferential surface of the main spindle that faces the inner circumferential surface of the air sealing member so that the first annular groove is covered by the inner circumferential surface of the air sealing member, and
the air supply passage is connected to the first annular groove via the communication holes or slits that are formed in the air sealing member.

4. The main spindle device according to claim 3, wherein a second annular groove and a third annular groove that are formed, in the circumferential direction of the main spindle, on part of the outer circumferential surface of the main spindle between the first annular groove and the bearing are arranged in an axial direction of the main spindle in parallel with each other in this order from the front side to a rear side opposite to the front side,
the air supply passage is connected to the third annular groove;
a discharging passage that discharges fluid and foreign matter that enter through the gap between the housing and the main spindle is formed in a lower portion of the housing that faces the second annular groove; and
the air sealing member is disposed at a position such that the air sealing member does not cover the second annular groove and the third annular groove but covers the first annular groove.

5. The main spindle device according to claim 4, wherein the air supply passage includes a first air supply passage and a second air supply passage;
the first air supply passage is connected to the first annular groove so as to supply air to the first annular groove; and
the second air supply passage is connected to the third annular groove so as to supply air to the third annular groove.

6. The main spindle device according to claim 3, wherein a first inner-side air receiving groove is circumferentially formed on part of the inner circumferential surface of the air sealing member that faces the first annular groove;
the first outer-side air receiving groove is circumferentially formed on part of an outer circumferential surface of the air sealing member corresponding in axial position to the first inner-side air receiving groove;
the first outer-side air receiving groove is connected to the air supply passage; and
the plurality of communication holes or a plurality of slits cause the first outer-side air receiving groove and the first inner-side air receiving groove to communicate with each other.

7. The main spindle device according to claim 3, wherein the air supplied to the first annular groove is discharged into a first air sealing gap that is defined by a first outer circumferential surface portion that is part of the outer circumferential surface of the main spindle on the front side of the first annular groove and by part of the inner circumferential surface of the air sealing member that faces the first outer circumferential surface portion, and also discharged into a second air sealing gap that is defined by a second outer circumferential surface portion that is part of the outer circumferential surface of the main spindle on the rear side of the first annular groove and by part of the inner circumferential surface of the air sealing member that faces the second outer circumferential surface portion; and
the first and second air sealing gaps are formed so that a resistance to discharge of air through the first air sealing gap is less than a resistance to discharge of air through the second air sealing gap.

8. The main spindle device according to claim 7, wherein the first air sealing gap and the second air sealing gap are formed so that a distance between the first outer circumferential surface portion and the corresponding part of the inner circumferential surface of the first air sealing gap and a distance between the second outer circumferential surface portion and the corresponding part of the inner circumferential surface of the second air sealing gap are substantially equal to each other, and
a length of the first air sealing gap in the direction of the rotation axis is smaller than a length of the second air sealing gap in the direction of the rotation axis.

9. The main spindle device according to claim 1, wherein the air sealing member is detachably fixed to the housing by transition fit.

10. The main spindle device according to claim 1, wherein the main spindle and the air sealing member are made of respective materials that are different from each other, and
the air sealing member is made of the material that has a mechanical strength lower than a mechanical strength of the material for the main spindle.

* * * * *